United States Patent [19]

Quinn et al.

[11] Patent Number: 4,971,639
[45] Date of Patent: Nov. 20, 1990

[54] METHOD AND APPARATUS FOR JOINING POLYMERIC SUBSTRATES SUCH AS VINYL FRAMES

[75] Inventors: Robert Quinn, Huntington; John Grandy, Nesconset, both of N.Y.

[73] Assignee: Sampson Machine Company, Hauppauge, N.Y.

[21] Appl. No.: 316,977

[22] Filed: Feb. 28, 1989

[51] Int. Cl.⁵ .............................................. B29C 65/20
[52] U.S. Cl. ..................... 156/64; 156/304.2; 156/304.6; 156/309.6; 156/309.9; 156/358; 156/359; 156/360; 156/366; 156/378; 156/499
[58] Field of Search ............. 156/64, 157, 158, 304.1, 156/304.2, 304.6, 309.6, 309.9, 358, 359, 360, 366, 378, 499, 507, 503

[56] References Cited

U.S. PATENT DOCUMENTS

| | | | |
|---|---|---|---|
| 3,253,972 | 5/1966 | Huddleston | 156/304.2 |
| 3,853,655 | 12/1974 | Pecha | 156/304.2 |
| 4,008,118 | 2/1977 | Wesebaum et al. | 156/258 |
| 4,640,732 | 2/1987 | Stafford | 156/304.2 |

OTHER PUBLICATIONS

U-R-B-A-N AKS 4000 Brochure dated Jul., 1982.
U-R-B-A-N AKS 4210 Brochure dated 7-84.
U-R-B-A-N AKS 3500 AKS 3510 Brochure dated 8-84.
U-R-B-A-N AKS 4010 AKS 4000 Brochure dated 2-85.

Primary Examiner—Michael Wityshyn
Attorney, Agent, or Firm—Hoffmann & Baron

[57] ABSTRACT

A method and apparatus are provided for welding vinyl window and door frames. The apparatus includes a counting circuit or the like for measuring the time taken for burning off a selected length of a thermoplastic frame member. This time can be used to calculate a sufficient or optimal period for performing a heating or plastification step. Once the ends of the frame members are properly heated (plastified), they are fused by urging them towards each other. The fused members are then cooled for a period of time which also corresponds to the time required for burn-off. The apparatus further includes a heating plate which is pivotable between an operating position and a retracted position. The heating plate is also movable so that different surface portions can be used during burn-off and heating phases.

15 Claims, 2 Drawing Sheets

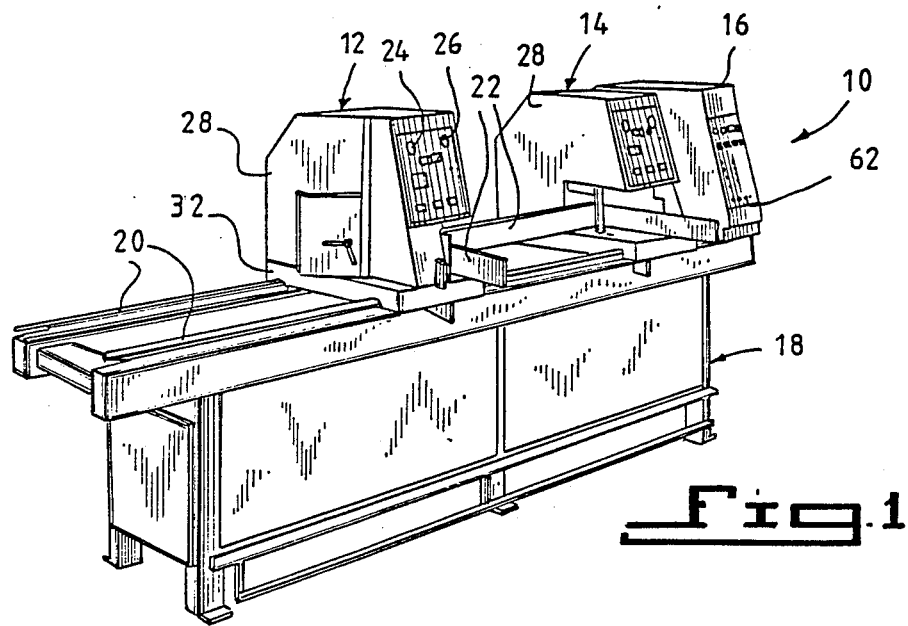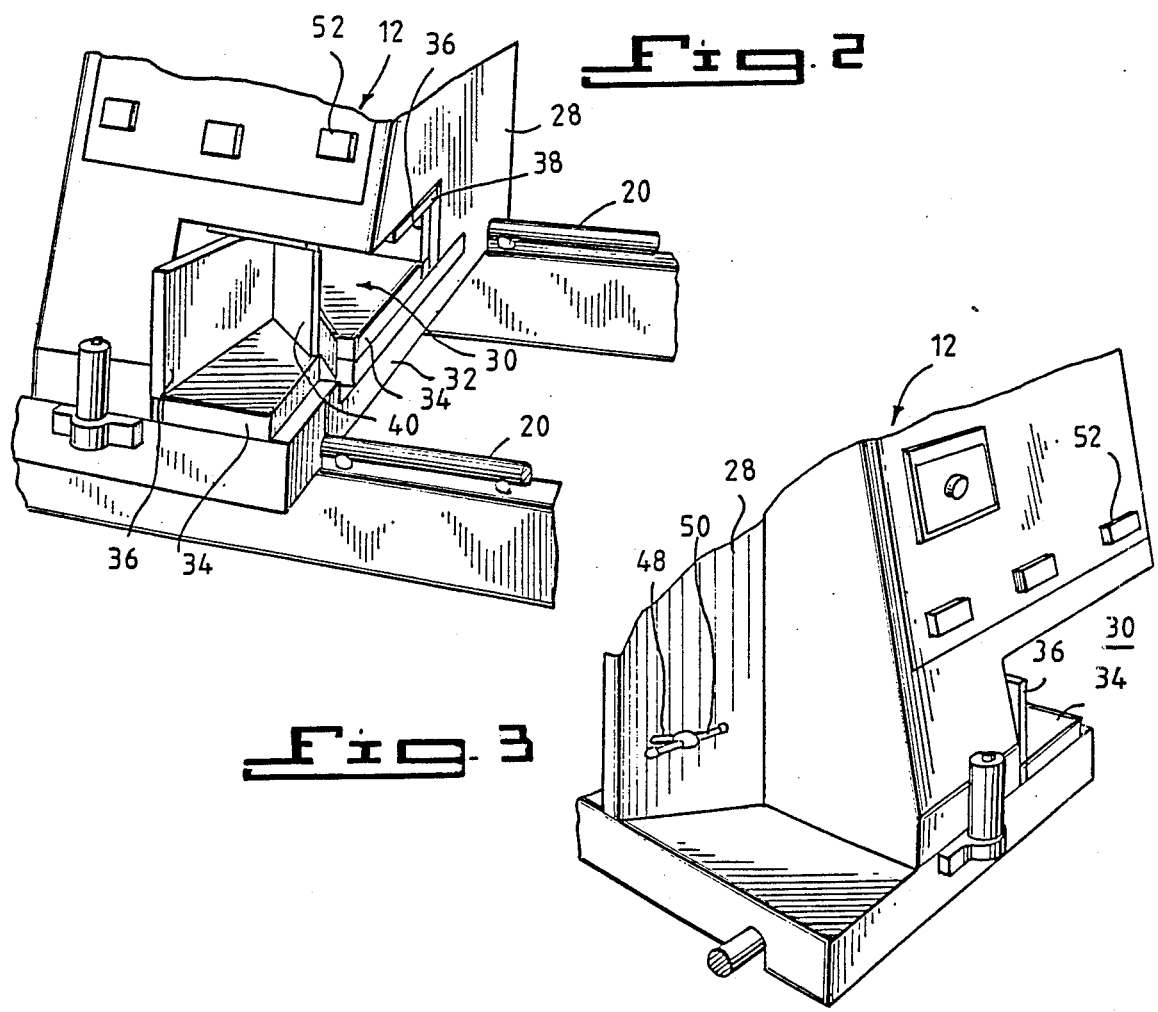

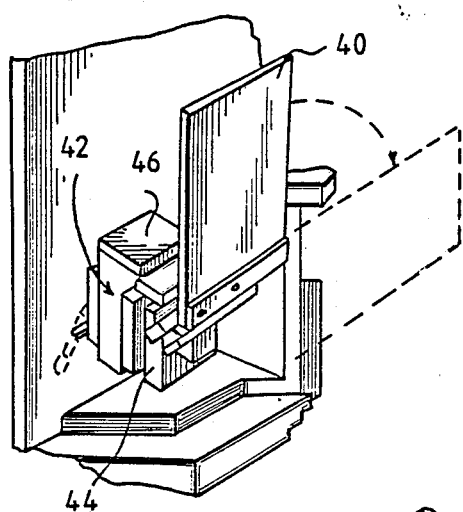
Fig. 4
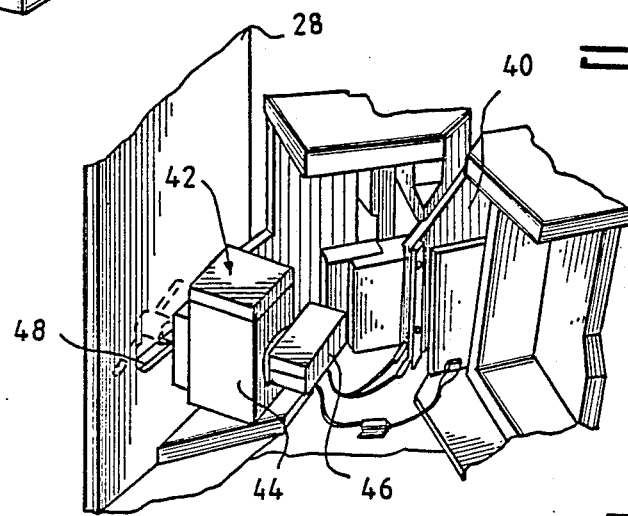
Fig. 5
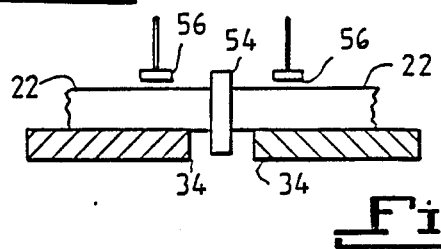
Fig. 6
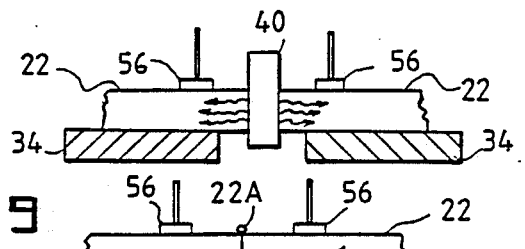
Fig. 8
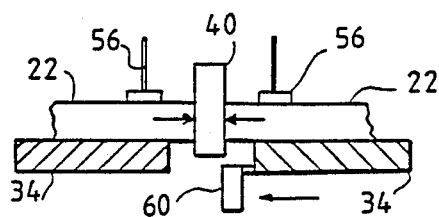
Fig. 7
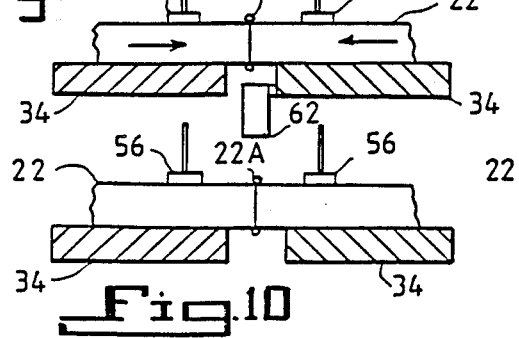
Fig. 9
Fig. 10

METHOD AND APPARATUS FOR JOINING POLYMERIC SUBSTRATES SUCH AS VINYL FRAMES

BACKGROUND OF THE INVENTION

The field of the invention relates to welding methods and apparatus, particularly for manufacturing vinyl window and door frames and the like.

Vinyl window and door products are assembled using either mechanical or welding techniques. The former generally involves the use of screws and/or other fasteners or fastening materials such as adhesives. Vinyl welding is a process in which the material edges of two vinyl frame members are heated at high temperature to a soft state and then pressed together and allowed to solidify into a rigid corner.

Five steps are generally performed in the vinyl welding process: sizing and clamping, burn-off, heating, fusion and cooling. The first step is accomplished by positioning the mitered edges of two frame members against a sizing plate and clamping the frame members in place. The sizing plate is removed and a heating plate inserted in its placed. A plate temperature of about 460° F. is maintained as the two profile sections are moved towards the plate. Such movement continues until about two thirds of the excess material at each end of the respective frame members has been displaced.

The heating cycle, also referred to as the plastification cycle, involves holding the frame profiles in a stationary position against the heater plate for a selected length of time. During this period, the ends of the frames are heated and become soft. At the conclusion of the heating cycle, the heater plate is retracted and the profiles are again moved towards one another. This results in the further compression and fusion of each frame member, thereby displacing the remaining third of the material which was overcut. This movement may be controlled by an internal limit switch.

The last phase of the cycle involves holding the fused material in a stationary position for a length of time. The material cools and solidifies into a rigid corner which can then be removed from the machine.

It is important to allow sufficient time for the heating and cooling cycles as they are critical to establishing a strong bond between frame members. This time will vary depending upon the material employed and the cross sectional areas of the frame members, assuming the temperatures of the heating plate and cooling medium (usually air) are constant. Since there are no reliable inspection methods for determining whether plastification or solidification have been satisfactorily completed, it is generally left to the operator to make these determinations. The skill and experience levels of operators of vinyl welding equipment are variable, which can therefore lead to inconsistent results in the vinyl welding process. Insufficient heating and/or cooling time causes the bond between frame members to be weak. Removal of the frame members from the machine prior to completion of the cooling cycle may result in the distortion of the resulting frame. On the other hand, efficiency may be greatly reduced if too much time is allowed for cooling the fused frame members.

As discussed above, the heating plate is a critical element in the burn-off and heating cycles. Despite the use of materials such as TEFLON (polytetrafluoroethylene) to protect the plate, plastic material tends to accumulate thereon. Replacement and/or cleaning of the plate is accordingly required from time to time, thereby reducing the efficiency of the welding apparatus.

SUMMARY OF THE INVENTION

It is an object of the invention to provide a method and apparatus for automatically and accurately controlling the duration of the heating and/or cooling cycles of a welding process used for joining polymeric substrates such as vinyl frame members.

It is another object of the invention to provide a method which includes determining the time required for a burn-off cycle to be completed, and allowing the heating and/or cooling cycles to proceed for a duration based upon the time required for burn-off.

A still further object of the invention is to provide a retractable heating plate and means for adjusting the position of the heating plate with respect to frame members.

It has been found that the time required to complete the burn-off phase of a vinyl welding process is related to the periods required for the subsequent heating and cooling phases thereof. Since the burn-off phase is completed prior to commencement of the heating and cooling phases, the time required for burn-off can be measured, and this measurement used to calculate the appropriate periods for both heating and cooling. This allows the heating and cooling steps to be performed both accurately and automatically without operator error.

The time required to complete the burn-off phase is, as expected, longer for frame members having large cross sectional areas than those having relatively small cross sectional areas. The physical properties of the material comprising the frame members also influence this period of time. The optimal heating and cooling periods have been found to be generally proportional to the burn-off period, although the relationship is not entirely linear. This relationship can be programmed into a microprocessor for controlling the heating and cooling phases of the welding process.

The heating plate in accordance with the invention is pivotably mounted to a support which allows it to pivot between an operating position and a retracted position. Means are provided for adjusting the position of the heating plate with respect to the support for the frame members. The pivot axis of the heating plate may accordingly be changed with respect to the support for the frame members to allow different portions of the heating plate surfaces to be used for the burn-off and/or heating cycles.

BRIEF DESCRIPTION OF THE DRAWINGS

FIG. 1 is a perspective view of a vinyl welding apparatus according to the invention;

FIG. 2 is an enlarged perspective view of the welding area thereof;

FIG. 3 is an enlarged perspective view of a side portion of a welding station;

FIG. 4 is a rear perspective view of a portion of a welding station including a heating plate in the retracted position;

FIG. 5 is a rear perspective view of the welding station showing the heating plate in the operating position;

FIG. 6 is a schematic illustration of the sizing and clamping of two frame members;

FIG. 7 is a schematic illustration of the burn-off cycle;

FIG. 8 is a schematic illustration of the heating cycle;

FIG. 9 is a schematic illustration of the fusion cycle;

FIG. 10 is a schematic illustration of the frame cooling cycle.

DETAILED DESCRIPTION OF THE INVENTION

A method and an apparatus are provided for welding polymeric frame members and the like to each other. Such frames are commonly used in vinyl window and door products.

The material used to manufacture vinyl extrusions for window and door frames is a polyvinylchloride compound which structural strength and color. A variety of such products can be extruded from this material, such as frame or sash members for single and double hung windows, picture windows, bow and bay windows, patio doors, atrium doors, and skylights. These extruded frame members, which are often referred to as "profiles" are accordingly available in a number of sizes and shapes. The cross sectional configurations and areas thereof vary substantially among the many types of profiles.

Manufacturers of the above-referenced products frequently employ vinyl welding equipment to assemble vinyl frames and sashes. The same piece of equipment is typically used to bond profiles of many different sizes and shapes. Due to the significant differences among the profiles, the periods required to perform certain welding steps vary significantly. A system 10 is provided by the invention which allows profiles of virtually any size or configuration to be bonded reliably and automatically.

As shown in FIG. 1, the system includes a pair of welding stations 12, 14 and a control module 16. Each of these components is mounted to a structural steel stand 18 which includes tracks 20. The stations 12,14 are slidable upon the tracks to allow frame profiles 22 of various sizes to be mounted thereto. Control dials 24,26 and associated gauges are provided for setting the desired welding pressure and clamping pressure, respectively.

Each station 12, 14 includes a housing 28 which defines a rectangular slot 30. The housing is mounted upon a base 32 which is supported by the tracks 20 and defines a lower boundary of the slot. A pair of base plates 34 are mounted to the base 32. The slot is bounded by a pair of perpendicular steel fences 36 which may or may not be adjustable in position. At least one of the base plates 34 is movable with respect to one of the steel fences. Profile fixturing members (not shown) may be provided for maintaining the profiles 22 in position during the welding process.

Limiters 38 (including stainless steel knife inserts) are provided to "pinch" the weld bead in contact with the profile surface to a minimum of 0.008". The limiters may be constructed from aluminum plates and are attached to vertical clamp pads (not shown) and the surfaces of the respective welding stations 12,14. Internal heaters are provided to heat the frame profiles 22, thus reducing the temperature gradient during the weld process. Clamping of the profiles may be accomplished in a conventional manner or as described in commonly assigned U.S. application Ser. No. 286,999 filed Dec. 20, 1988 entitled "Apparatus For Welding Thermoplastic Frame Members", now U.S. Pat. No. 4,909,892 which is incorporated by reference herein.

An aluminum heating plate 40 is mounted diagonally with respect to the slot. It is pivotably movable between the position shown in FIG. 2 and a retracted position within the housing 28 as shown in FIG. 4. A pneumatically operated rotary actuator 42 is provided for moving the heating plate between the operating and retracted positions. The actuator 42 is mounted to a support block 44 which, in turn, supports a rotatable member 46. An elongated slot 48 extends through a wall of the housing 28, and the support block 44 is positioned adjacent to the slot. A mounting member including a knob 50 extends through the slot 48. The support block 44 may be locked in position with respect to the slot 48 by tightening the knob 50, which is connected to the support block 44. This allows a selected area of the heating plate 40 to be used for heating the profiles 22. A different area may be used by simply loosening the knob and sliding the actuator 42 in either direction Upon tightening, the window or door frame manufacturing operation may resume.

FIGS. 6-10 schematically illustrate the steps performed during the welding process. The sequence begins by manually positioning the mitered edge of one of the frame profiles 22 against the rear fixtures of each welding station 12,14. By pressing a sizing/clamping button 52 (FIG. 2) at either welding station, a sizing plate 54 (FIG. 6) is rotated upwardly from beneath each station and above the lower surfaces of the slots 30. One of the stations is then caused to move towards the other until the frame profile is securely located between the sizing plates of each station. A right side frame member is then positioned in the right side weld station such that it rests squarely against the sizing plate 54, as shown in FIG. 6. Clamps 56 are then actuated to secure the profile in position upon one of the base plates 34. This procedure is repeated at the left side welding station when a left side frame profile 22 is positioned therein.

The actual welding cycle begins by retracting the sizing plate 54 and rotating the heating plate 40 into position. The temperature of the heating plate is preferably maintained at about 460° F. when working with PVC materials. The profiles 22 are mechanically urged towards the respective heating plates by the movement of one or both of the base plates 34 within each station 12,14 until contact is made with a limit switch 60. The heating plate is preferably spring-loaded so that it is urged towards an end of an adjacent profile once contacted by a first profile. Each profile is pre-cut to a dimension which is about 7/32 of an inch larger than the finished frame size. This over-cut is needed in order to compensate for the material that is displaced or removed from each mitered end of the profile during the welding process. Upon contact with the limit switch during this "burn-off" cycle, about 65% of the overcut material will have been removed. The length of time for the burn-off cycle (FIG. 7) to be completed is mostly dependent upon the cross-section of the profile, and normally ranges from about three to about twenty seconds for small to large profiles.

Upon engagement of the limit switches at each station, the heating phase will begin. To provide for an automatic and optimized plastification of the profiles, a programmable controller is provided within the control module 16 which measures the time required for burn-off and uses this measurement to determine the times required for the heating phase and, subsequently, the cooling phase. A counting circuit is incorporated within the control module to measure the length of the burn-off period The heating time and cooling time are proportional to the burn-off time. Such a relationship is programmed into the controller which thereby controls the duration of the heating cycle. The heating phase (FIG. 8) normally lasts between about ten seconds and thirty seconds. No machine movement occurs during this period. Once this phase is completed, the control module sends a signal to the actuator 42 causing the heating plate 40 to be rotated upwardly into a storage position as shown in FIG. 4.

Once the heating plate is retracted, the fusion phase begins as the profiles 22 are again mechanically moved towards each other as shown in FIG. 9. This results in a compression or fusion of the material which displaces remaining 35% of the material which was over-cut, thereby forming a pair of beads 22A. Movement of the weld tables 34 is controlled by a limit switch 62 which guarantees consistent material loss.

Upon engagement of the limit switches at each station 12, 14, the cooling phase (FIG. 10) of the welding process begins. A second machine timer is actuated, the first having been used in the heating phase. The cooling period, which is determined by the controller as a function of the time required for burn-off, normally lasts about 12–32 seconds. The material undergoes ambient cooling and solidifies into a rigid corner which can then be removed from the machine. One of the stations 12, 14 is retracted to facilitate such removal. A signal is generated by the control module light indicators 62 to indicate the end of the cooling cycle and to let the operator know it is safe to remove the frame.

The program employed within the controller for controlling the duration of the heating and cooling cycles uses a pair of formulas based upon the duration of the burn-off cycle, namely:

$$H\ (sec.) = BO + 7$$

$$C\ (sec.) = BO + 9$$

where H is the duration of the heating cycle C is the duration of the cooling cycle, and BO is the duration of the burn-off cycle, all in seconds. The above formulas are used where the burn-off cycle is at least three seconds, but less than about twenty-six seconds. If the burn-off time is less than three seconds, the assumption is made that the material has slipped in the machine, in which case the heating and cooling times are automatically set for fifteen and seventeen seconds, respectively. Accordingly, even if the profile has slipped, the average time settings for heating and cooling should guarantee that the profiles are welded together.

An upper limit for the setting of heating and cooling times is programmed into the system. This is established by limiting the maximum allowable burn-off time to be used in the above formulas to twenty-six seconds. An assumption is made that if the burn-off time has exceeded this upper limit, a fault has occurred within the system. Heating and cooling times are set at thirty-three and thirty-five seconds, respectively, in such event.

The formulas provided above have been found to be sufficient for most if not all applications, although they do not necessarily always provide the optimal cycle times. It is apparent that the relationships between burn-off and the other cycle times could be fine tuned for various materials. These relationships would not necessarily be linear as defined above.

While a preferred method of estimating the proper heating and cooling periods in the manufacture of PVC frames has been disclosed, other more indirect methods could alternatively be employed. Such methods include weighing a profile as it rests on the tables in the stations 12, 14, and determining the cycle times as a function of weight per unit length. The cross sectional areas of the ends of a profile could also be determined, and this information used to properly program the controller.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An assembly for preparing a thermoplastic frame member for fusion with a second thermoplastic frame member, comprising:
   a heating plate;
   means for urging a pair of elongate thermoplastic frame members towards and into contact with said heating plate for burning off selected lengths of said thermoplastic frame members;
   means for measuring the time taken for burning off said selected lengths of thermoplastic frame members;
   means for converting said time taken for burning off said selected lengths of said thermoplastic frame members to an acceptable time period for heating said thermoplastic frame members to a sufficient extent to allow said thermoplastic frame members to be fused upon being joined to each other;
   means for maintaining an end of each of said thermoplastic frame members in stationary contact with said heating plate, thereby heating said ends of said thermoplastic frame members; and
   means for discontinuing said heating of said ends of said thermoplastic frame members once said acceptable time period for heating has elapsed.

2. An assembly as defined in claim 1 wherein said urging means includes a base plate.

3. An assembly as defined in claim 2 including a limit switch, and means for contacting said limit switch once said selected lengths of said thermoplastic frame member have been burned off.

4. An assembly as defined in claim 3 wherein said measuring means includes a counting circuit.

5. An assembly as defined in claim 3 wherein said converting means includes a programmable controller.

6. An assembly as defined in claim 5 wherein said maintaining means includes said base plate and a clamp.

7. An assembly as defined in claim 2 including means for moving said heating plate between an operating position adjacent to said base plate and a retracted position.

8. An assembly as defined in claim 1 including means for converting said time taken for burning off said selected lengths of frame members to an acceptable period for cooling said frame members after fusion thereof, and means for signaling the end of said cooling period.

9. An assembly for preparing a first thermoplastic frame member for fusion with a second thermoplastic frame member, comprising:
   a heating plate;

a means for urging a pair of elongate thermoplastic frame members towards and into contact with said heating plate;

means for moving said heating plate to a retracted position out of contact with a pair of elongate thermoplastic frame members;

means for determining a physical characteristic of an elongate thermoplastic frame member, which physical characteristic is usable for determining an acceptable period for heating the ends of a pair of elongate thermoplastic frame members prior to the fusion thereof; and a programmable controller for controlling said means for moving said heating plate to said retracted position, said programmable controller being programmed to cause said heating plate to be moved to said retracted position after a certain time period based upon said physical characteristic of an elongate thermoplastic frame member.

10. An assembly as defined in claim 9 wherein said physical characteristic is the time required for burning off a selected length of an elongate thermoplastic frame member.

11. A method for fusing a pair of thermoplastic frame members to each other, comprising:

providing a first thermoplastic frame member;

providing a second thermoplastic frame member;

urging each of said thermoplastic frame members towards a heating plate, thereby burning off a selected length of each of said thermoplastic frame members;

measuring the time required for burning off said selected length of at least one of said thermoplastic frame members;

heating an end of at least one of sad thermoplastic frame members by maintaining said end of said at least one of said thermoplastic frame members in contact with said heating plate for a first period of time proportional to the time required for burning off; and joining said end of said at least one of said thermoplastic frame members to the other of said thermoplastic frame members, thereby fusing said first and second thermoplastic frame members.

12. A method as defined in claim 11 including the step of maintaining the joined thermoplastic frame members in a substantially fixed position for a period of time proportional to the time required for burning off.

13. A method as defined in claim 11 including the steps of supporting said thermoplastic frame members during the joining thereof, allowing said joined thermoplastic frame members to cool for a second period of time proportional to the time required for burning off, providing a signal at the end of said second period of time, and discontinuing supporting said thermoplastic frame members once said signal has been provided.

14. An apparatus for welding the ends of a pair of elongate, thermoplastic frame members to each other, comprising:

a welding station including a housing having walls, frame supporting means mounted to said housing for supporting a pair of thermoplastic frame members, means for moving thermoplastic frame members supported by said frame supporting means towards each other, a slot defined within a wall of said housing, a support block positioned adjacent to said slot, a mounting member connected to said support block and extending through said slot, and a rotatable member pivotably mounted to said support block;

a heating plate mounted to said rotatable member;

means for pivotably moving said rotatable member about a pivot axis such that said heating plate is movable between a first position adjacent said frame supporting means and a second position remote from said frame supporting means; and said heating plate being movable translationally with respect to said frame supporting means by moving said support block with respect to said slot.

15. An apparatus as defined in claim 14 wherein said frame supporting means includes a base plate.

* * * * *